(12) United States Patent
Kirkland et al.

(10) Patent No.: US 7,253,790 B2
(45) Date of Patent: Aug. 7, 2007

(54) NOTEBOOK COMPUTER AND HANDHELD DEVICE DISPLAY SKIN

(75) Inventors: Dustin Kirkland, Austin, TX (US); David Kumhyr, Austin, TX (US); Liliana Orozco, Del Valley, TX (US)

(73) Assignee: Lenovo (Singapore) Pte. Ld., Singapore (SG)

( * ) Notice: Subject to any disclaimer, the term of this patent is extended or adjusted under 35 U.S.C. 154(b) by 602 days.

(21) Appl. No.: 10/753,855

(22) Filed: Jan. 8, 2004

(65) Prior Publication Data

US 2005/0151702 A1 Jul. 14, 2005

(51) Int. Cl.
*G09G 5/00* (2006.01)
(52) U.S. Cl. .................................. 345/1.3; 345/169
(58) Field of Classification Search .......... 345/1.1–1.3, 345/2.1–2.3, 156–173, 45
See application file for complete search history.

(56) References Cited

U.S. PATENT DOCUMENTS

| | | | | |
|---|---|---|---|---|
| 5,881,299 A | * | 3/1999 | Nomura et al. | 713/324 |
| 6,069,593 A | * | 5/2000 | Lebby et al. | 345/1.1 |
| 2002/0047569 A1 | | 4/2002 | Dowling et al. | 315/169.3 |
| 2002/0190975 A1 | | 12/2002 | Kerr | 345/211 |
| 2003/0002246 A1 | | 1/2003 | Kerr | 361/683 |
| 2003/0173408 A1 | | 9/2003 | Mosher, Jr. et al. | 235/492 |
| 2003/0174377 A1 | | 9/2003 | Reynolds et al. | 359/265 |
| 2005/0083642 A1 | * | 4/2005 | Senpuku et al. | 361/681 |

OTHER PUBLICATIONS

"New Camera Phones from Samsung, the SGH-E700 and SGH-P400," The gadgets weblog, printed Sep. 24, 2003; p. 1 of 1.

* cited by examiner

*Primary Examiner*—Nitin I. Patel
(74) *Attorney, Agent, or Firm*—Winstead PC

(57) ABSTRACT

A portable data processing device is provided with first and second display devices. The first display device receives signals for displaying a first set of information, and the second display device receives signals for displaying a second set of information. The second display device forms a skin of the portable data processing device. The device also has a graphics engine for receiving data for generating display signals for the first set information and the second set of information. Driver circuits are coupled to said first and second display devices, in which corresponding ones of the driver circuits are coupled to the first and second displays, the driver circuits being coupled to an output of the graphics engine. The first and second display devices have disjoint display areas.

16 Claims, 8 Drawing Sheets

NOTEBOOK COMPUTER AND HANDHELD DEVICE DISPLAY SKIN

TECHNICAL FIELD

The present invention relates to data processing systems and in particular to a display forming an external skin for a notebook or laptop computer, PDA, cell phone or other portable or "handheld" device.

BACKGROUND INFORMATION

Each day, it seems as though new, handheld electronic devices are introduced; cell phones, PDAs, pagers, Blackberry devices up to laptop computers are continually updated with new models. For the "early adopters," it is somewhat of a point of pride to have the very latest technology. It is an expression of their individuality.

Yet, there is a problem. One person's brand new cell phone looks much like another's cell phone. Potentially, the wrong device could be inadvertently taken. It also undermines the uniqueness of the device and the self expression of the user. This problem has been addressed to a degree in the case of some of the most popular cell phones by a multitude of add-on faces, for example. These faces are typically plastic and come in a wide variety of colors and designs. Other more crude, handmade ways of making one's handheld device have been witnessed by the inventor, e.g., smiley face stickers. These known solutions tend to be static and, beyond the function of identification, tend not to convey very much information.

While there a great number of colors, there are not as many colors as there are users. Furthermore, changing the appearance of the devices requires an investment in time and effort and possibly expense on the part of the user, which must be invested each time the appearance is to change.

Thus, it would be desirable if a easy, dynamically modifiable way of personalizing handheld devices could be developed. Further, it would be desirable if the method of personalization were capable of conveying dynamically changing information.

SUMMARY OF THE INVENTION

The aforementioned needs are addressed by the present invention. Accordingly, there is provided in one embodiment of the present invention a portable data processing device including first and second display devices. The first display device receives signals for displaying first information, and the second display device receives signals for displaying second information. The second display device forms a skin of the portable data processing device. The device also has a graphics engine for receiving data for generating display signals for the first information and the second information. Driver circuits are coupled to said first and second display devices, in which corresponding ones of the driver circuits are coupled to the first and second displays, the driver circuits being coupled to an output of the graphics engine. The first and second display devices have disjoint display areas.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
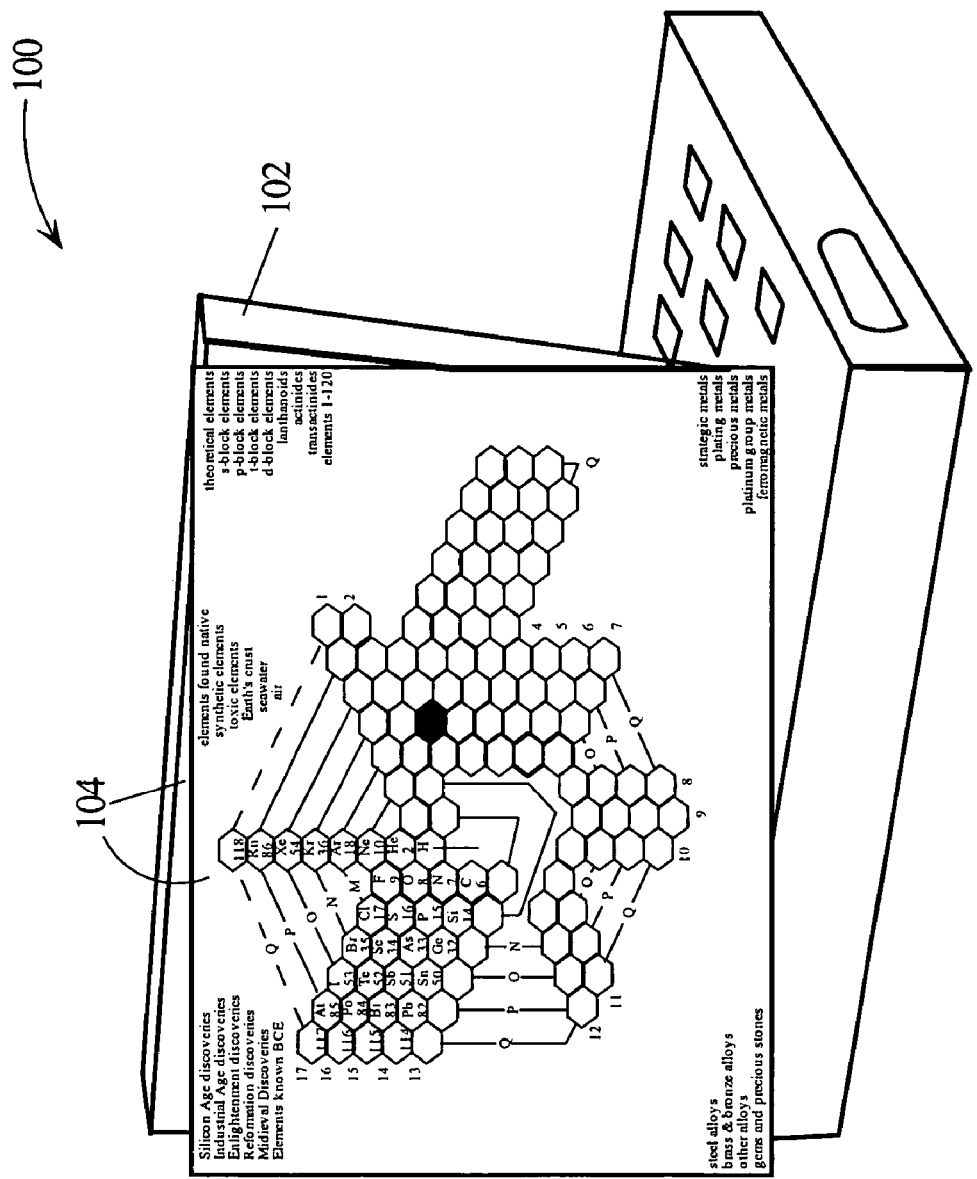
FIGS. 1 and 2 illustrate a notebook computer having a display "skin" in accordance with an embodiment of the present invention.

In the following description, numerous specific details are set forth to provide a thorough understanding of the present invention. For example, particular bus interfaces may be referred so as to illustrate the present inventive principles. However, it would be recognized by those of ordinary skill in the art that the present invention may be practiced without such specific details, and in other instances, well-known circuits have been shown in block diagram form in order not to obscure the present invention in unnecessary detail. Refer now to the drawings, wherein depicted elements are not necessarily shown to scale and wherein like or similar elements are designated by the same reference numeral through the several views.

FIG. 1 illustrates (in rear view) a notebook computer 100 having a skin formed from a flexible OLED display 102. A suitable OLED display material which may be used in conjunction with the present invention is a flexible OLED display technology (FOLED) available from Universal Display Corporation, Ewing, N.J. The OLED skin may display a message and/or graphic 104 to viewers facing the user, for example, who views the conventional display (not shown in FIG. 1) from the front. The information displayed to the user need not be the same as that seen by viewers seeing the OLED skin, as discussed further hereinbelow.

Figure 2:
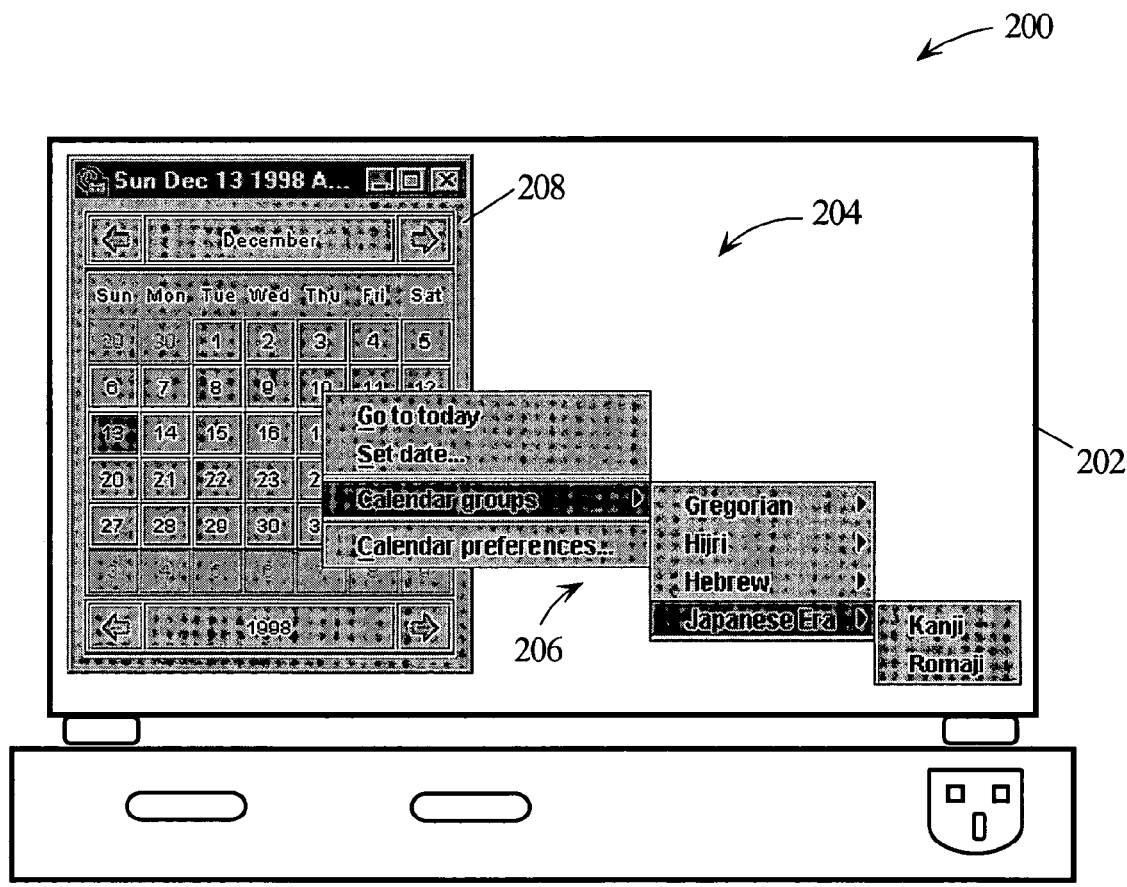

Alternatively, the OLED skin may be used to display the same information as seen by the user. FIG. 2 illustrates an embodiment 200 of a notebook computer having an OLED skin 202. Displayed information 204 reflects the same information displayed to the user viewing a conventional display (not shown in FIG. 2), here in the form of user-selections via a hierarchical menu 206 to select a format for calendar 208. Hierarchical menu 206 may, for example, be manipulated by user input actions on a touch pad or trackball (not shown in FIG. 2).

The information displayed on the OLED skin can be selected by the user. The OLED skin may selectably display the same information as being shown on the conventional display, as shown in FIG. 2, or different information as illustrated in FIG. 1, which may be sourced from a second application, for example. The user selection may be effected using a conventional menu/dialog box graphical user interface. Alternative user input mechanisms such as a function key/mouse click combination may be used to associate an information source, such as an application. A registry file entry may be used to store such an association, as is known in the art. Additionally, the user may selectably to turn off the OLED skin display.

Figure 3:
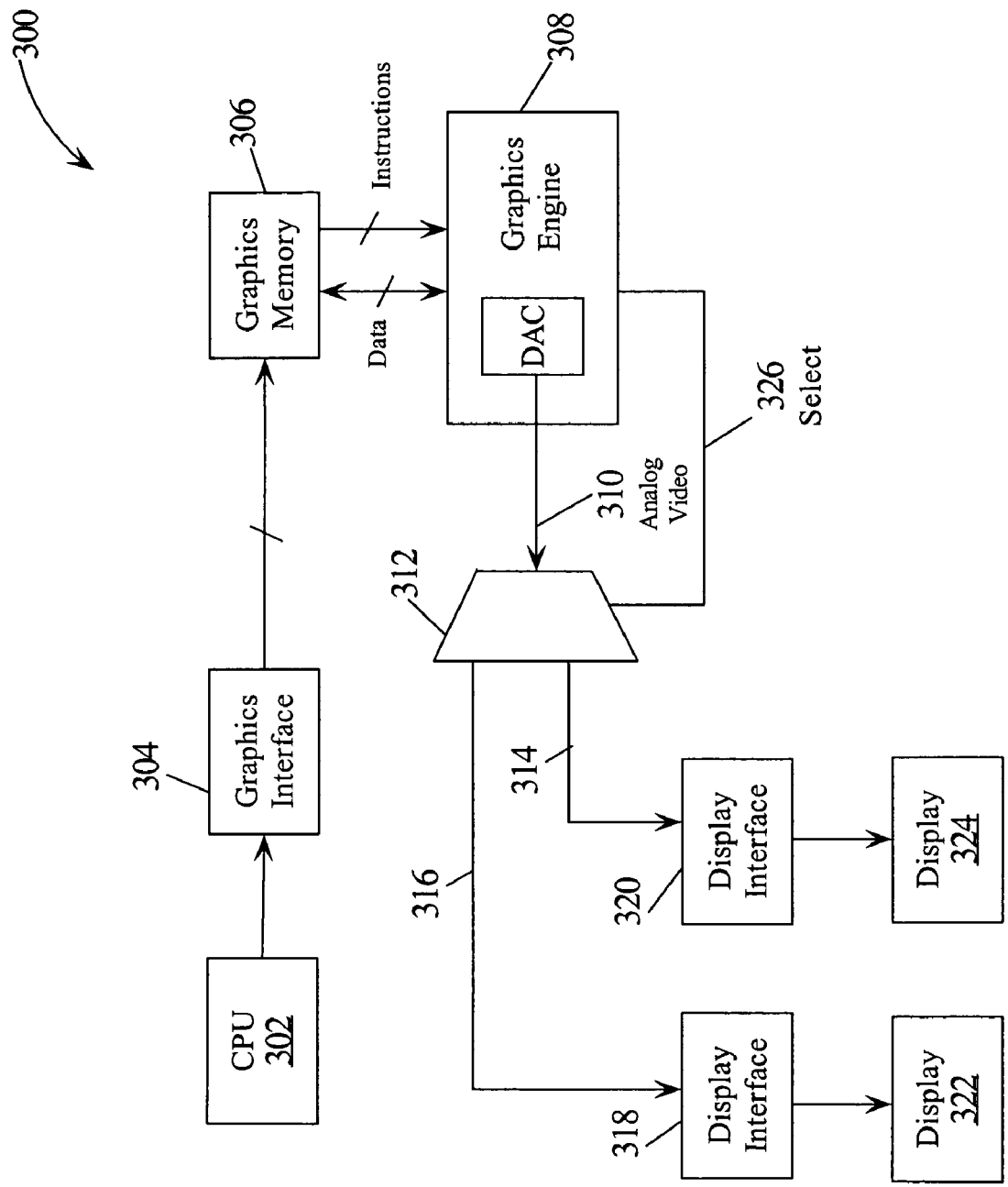
FIG. 3 illustrates a high-level block diagram of a graphics processing unit which may be used in conjunction with the data processing devices of FIGS. 1, 2 and 5.

FIG. 3 illustrates a high-level block diagram of a graphics processing unit which may be used to drive a conventional display, such as a liquid crystal display (LCD) commonly used on portable data processing devices in conjunction with an OLED display forming a "skin" for a cell phone or other portable data processing device in accordance with the present inventive principles.

Drawing instructions for the graphics object to be displayed, whether on the conventional display or the skin, are generated by CPU 302. These are transferred via a graphics interface 304 to graphics memory 306. In modern data processing systems, graphics memory 306 may be a dedicated memory for storing graphics data for subsequent rendering by graphics engine 308, which, itself, is a dedicated processor which may be particularly configured for performing the types of floating-point calculations commonly encountered in modern graphics-oriented data processing systems. Graphics interface 304 may, for example, be a Peripheral Component Interconnect (PCI) bus interface or, alternatively, and Advanced Graphics Port (AGP) bus interface. Graphics engine 308 reads graphics instructions from graphics memory 306. Additionally, graphics memory 306 may include a frame buffer for holding the video image. Graphics engine 308 and a graphics memory 306 including a frame buffer are conventional and known to those of ordinary skill in the art.

Graphics engine 308 reads the frame buffer and converts the digital data to an analog signal 310, which is input to the multiplexor (DEMUX) 312. A pair of outputs 314 and 316 from DEMUX are coupled to corresponding display interfaces 318 and 320. The output of display interface is provided to display 320, which may be the conventional display for the portable device, such as a conventional liquid crystal display (LCD). Display interface 318 receives the analog signals from output 316 of DEMUX 312 and provides any necessary level shifting to drive display 322L Similarly, display interface 320 coupled to output 314 of DEMUX 312 drives display 324, which may be the OLED skin of the portable device. The outputs of DEMUX 312 are selected via select 326, which sends the analog video 310 to the appropriate one of displays 322 and 324. The target display is determined by the source of the graphic object being displayed, which is determined by the application software being executed by CPU 302. Thus, for example, one display, typically the conventional LCD device, may be displaying information related to a user application running on CPU 302, while the OLED skin may be displaying alternative information, such as message 104, FIG. 1.

Figure 4:
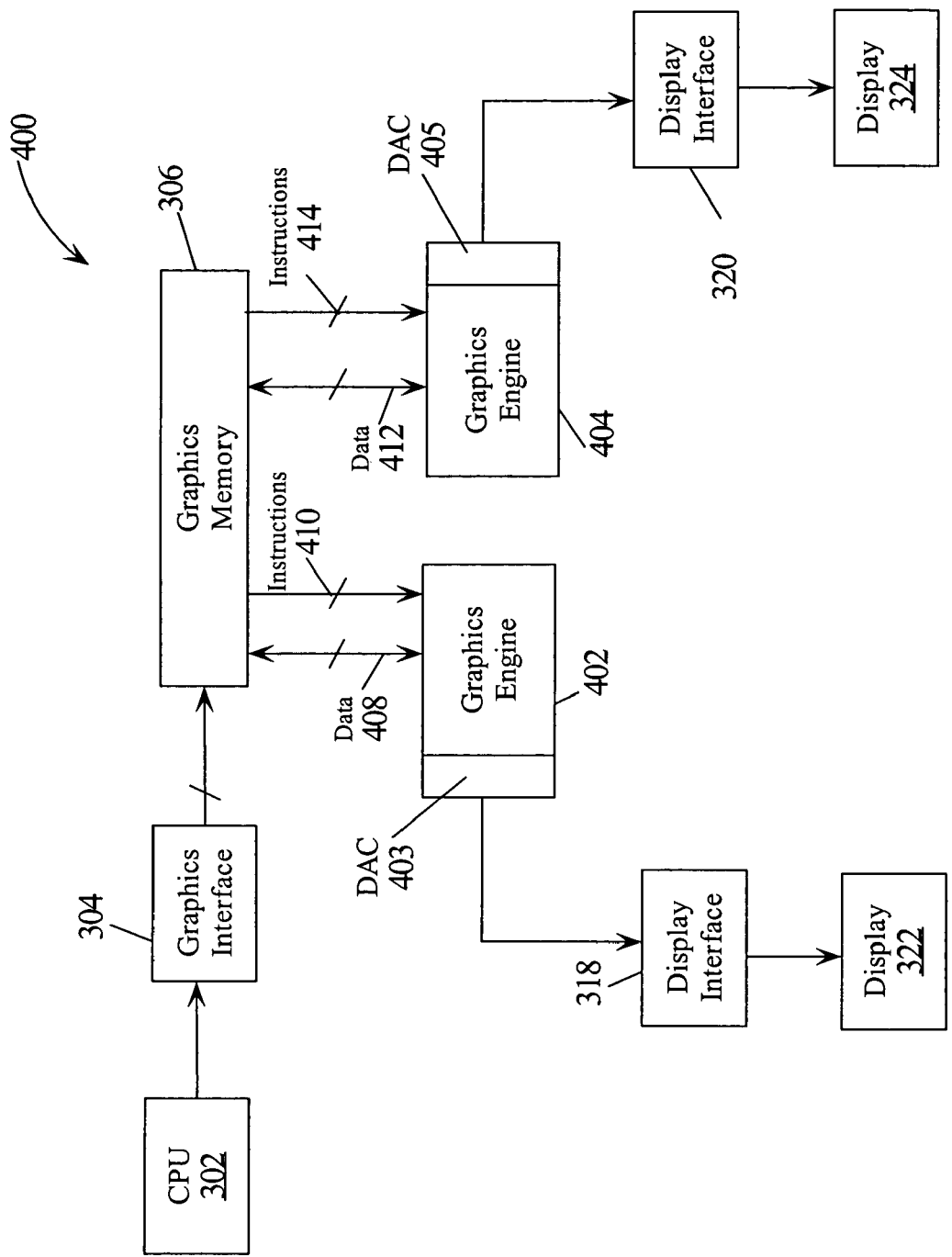
FIG. 4 illustrates a high-level block diagram of an alternative embodiment of a graphics processing unit which may be used in conjunction with the data processing devices of FIGS. 1, 2 and 5.

Referring now to FIG. 4, there is illustrated an alternative embodiment of graphics processing unit 400 in accordance with the present inventive principles. CPU 302, graphics interface 304 and graphics memory 306 function as previously discussed in conjunction with FIG. 3. Similarly, display 322 and its associating interface 318 may be a conventional LCD display and associated driver logic for performing level shifts, etc., as needed. Information to be displayed is, however, generated by graphics engine 402 in conjunction with DAC 403 for converting the digitally represented graphical information in analog form as required by display 322. Note that although DAC 403 is shown in conjunction with graphics engine 402, it would be appreciated by those of ordinary skill in the art that the digital-to-analog conversion circuitry may be included, alternatively, in display interface 318. Graphics engine 402 is coupled to graphics memory via data path 408 and instruction path 410.

Display 324 and its associated graphics interface 320 recieve graphics information generated via graphics engine 404 and associated DAC, DAC 405. As previously discussed in conjunction with FIG. 3, display 324 may constitute an OLED skin of a notebook computer or other portable data processing device, such as a PDA, cellphone, etc. Graphics engine 404 is coupled to graphics memory 306 via data path 412 and instruction path 414.

The use of two graphics engines, 402 and 404 in graphics system 400 may accommodate display devices having different specifications with respect to resolution, color depth, etc. In this way, the capabilities of the graphics engine may be adapted to the display device it is driving.

Figure 5A:
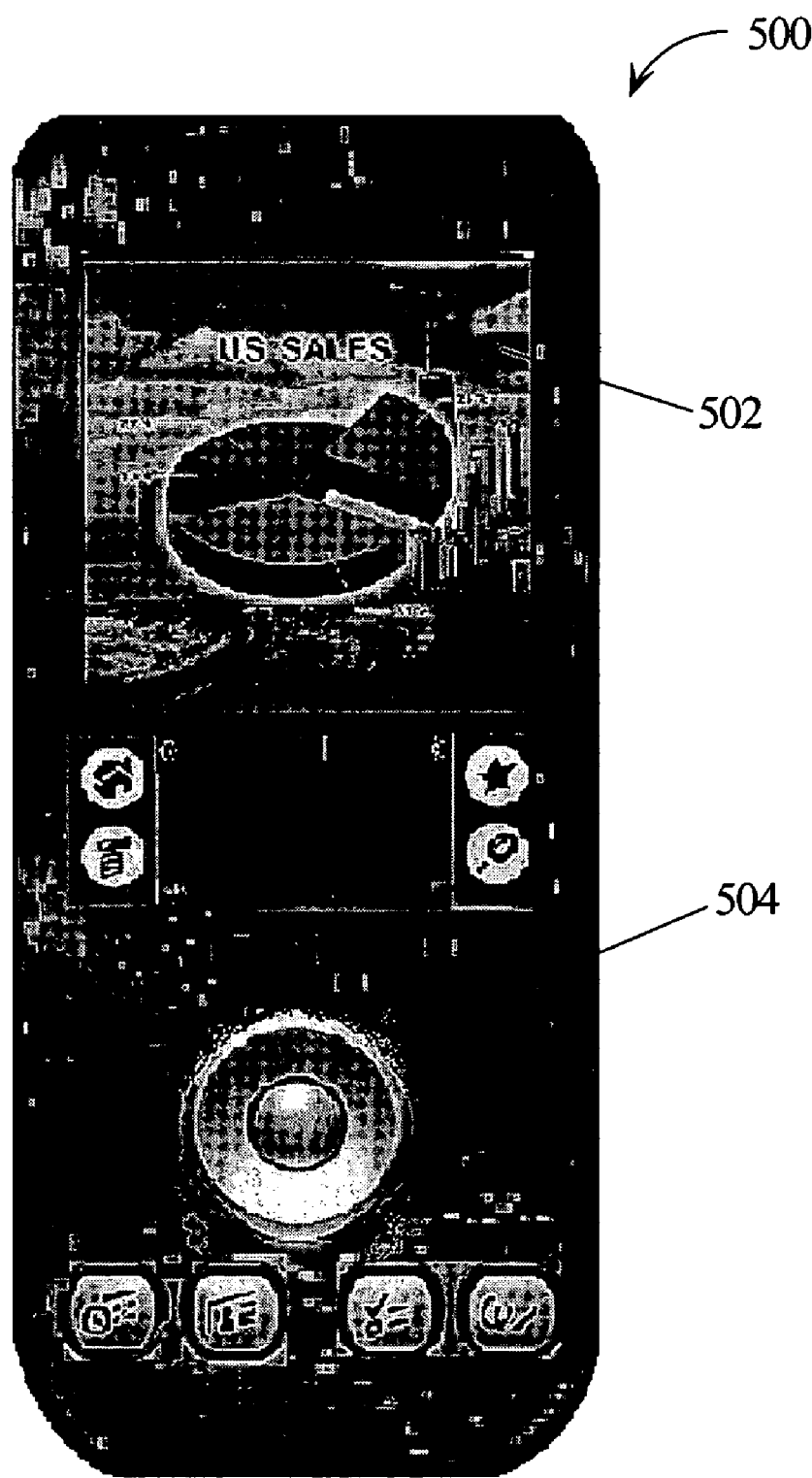
FIG. 5 illustrates a cell phone having a display skin in accordance with an embodiment of the present invention.
Figure 5B:
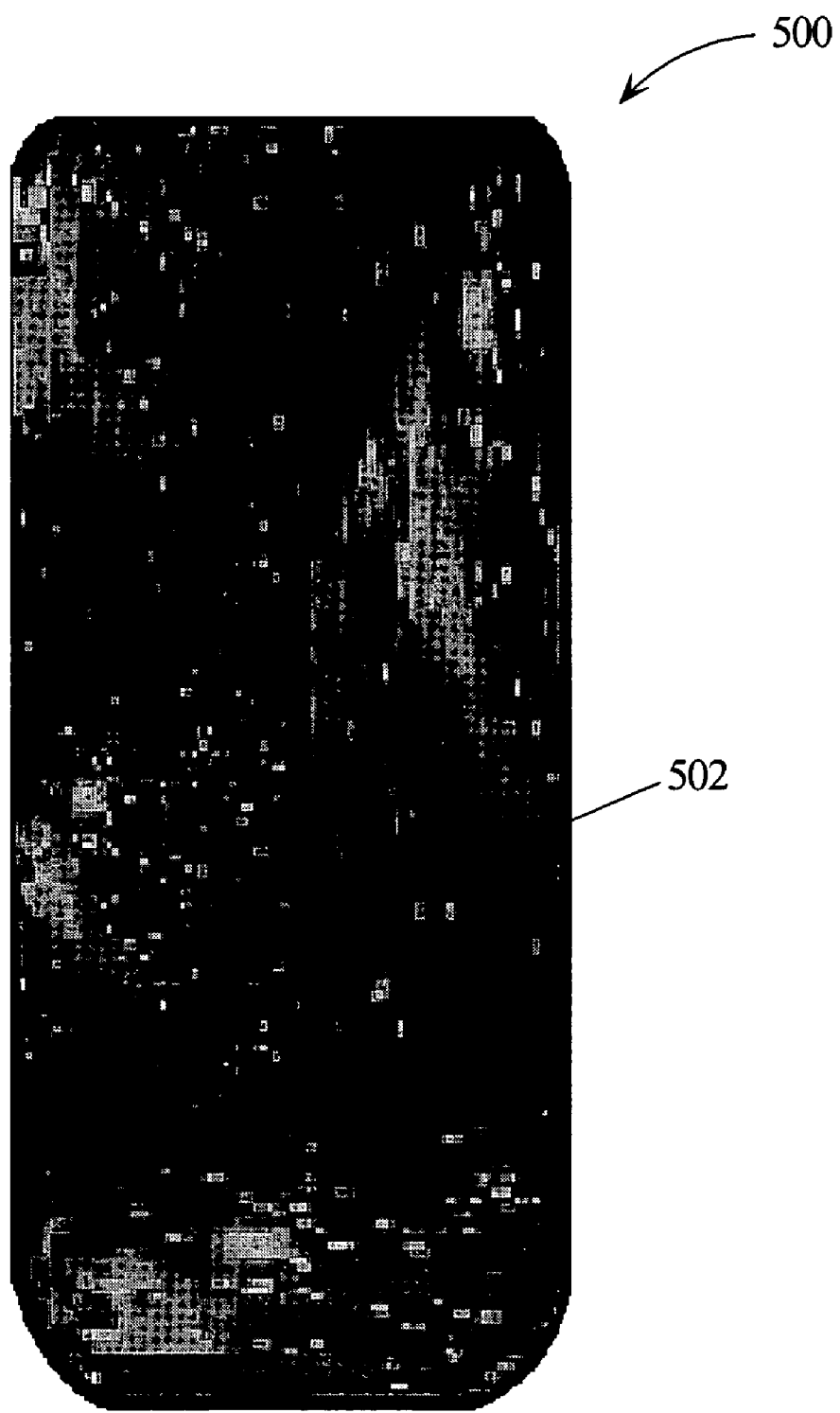

To further appreciate the principles of the present invention, refer to FIGS. 5A and 5B illustrating, respectively, a front and back view of a PDA 500 having a OLED skin in accordance with the principles of the present invention. PDA 500 includes a convention display 502, typically a LCD device. Additionally, OLED sin 504 provides a configurable look, similar to colored covers used on cell phones, etc., and similar to the "wallpaper" that users often display as background on conventional desktop monitors. Although such a "skin" may provide a user configurable "look" which may also be whimsical, such as a "lizard" skin that "breaths," the OLED display skin may be functional as well. For example, in a PDA, the skin may selectively be configured to change if, for example, the user has an instant message or e-mail pending. Although FIG. 5 illustrates a PDA 500, this device is illustrative, and the skin may be applied in similar fashion to other portable devices, such as a cell phone, or wireless messaging devices.

Figure 6:
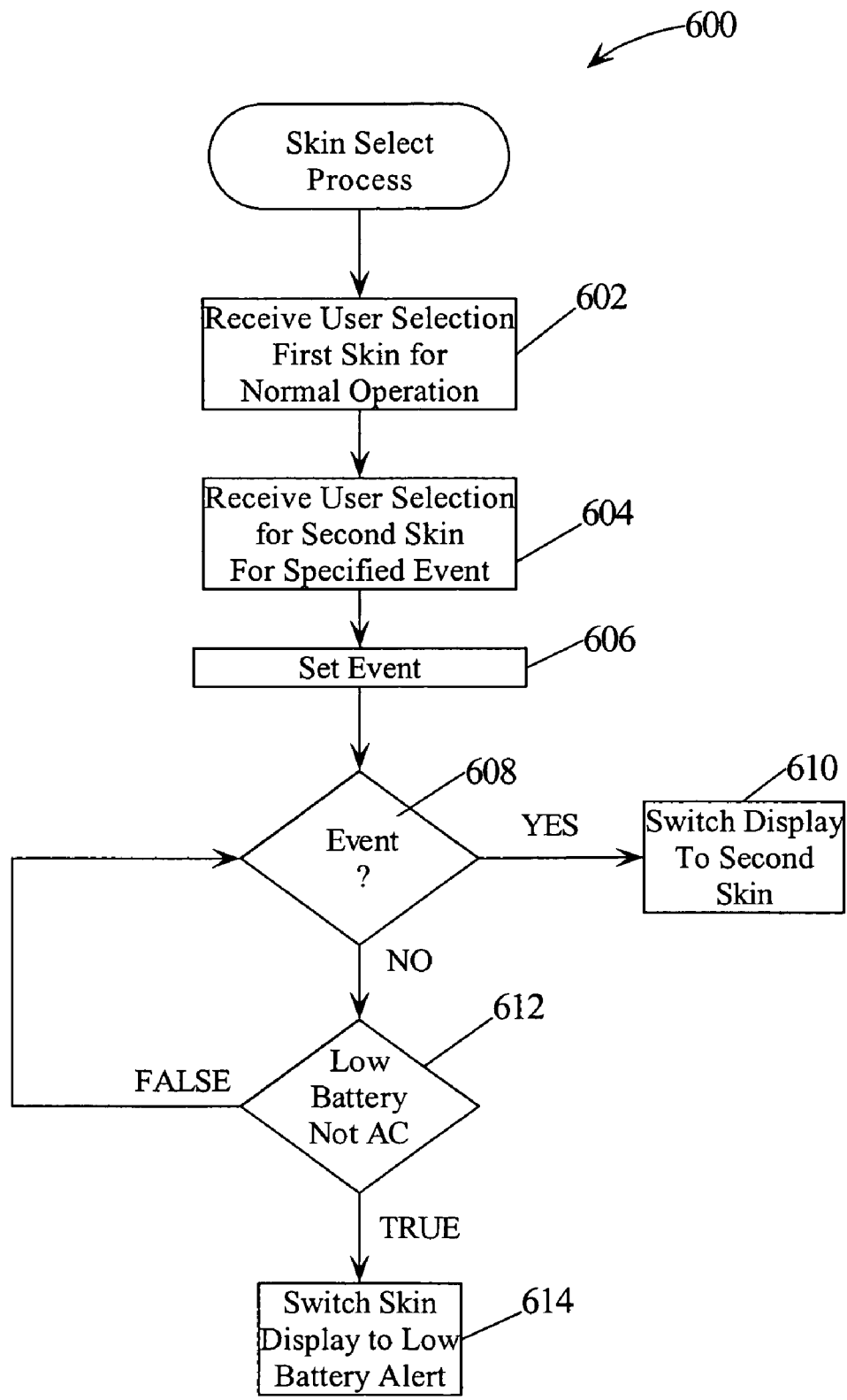
FIG. 6 illustrates a methodology for selecting alternative display skin sources in accordance with an embodiment of the present invention.

As previously discussed, a user may associate separate sources of the information to be displayed with the conventional display in the OLED skin. Additionally, the user may select different display information, typically graphical data, such as "wall paper," for normal operation and a second "skin" for display by the OLED display in association with a selected event. FIG. 6 illustrates a skin selection process 600 in accordance with the present inventive principles.

In step 602, a user selection for a skin for normal operation is received. The user may select the "skin," for example a graphics file that displays a decorative skin similar to user-selected wall paper displayed on a conventional desktop display. This selection, in accordance with techniques known in the art may be via a menu\dialog-box mechanism as commonly employed in graphical user interface based operating systems. As would be appreciated by persons of ordinary skill in the art, such mechanisms typically operate to permit the user to browse the file system, or alternatively, specify a path to the file via keyboard entry. Similarly, in step 604, a second "skin" may be selected for display on the occurrence of a specified event. Again, the selection may be made in similar fashion to the selection of the first skin.

In step 606 the event is set. Events may include, for example, receipt of an email from a specified address, or simply, an "alarm clock" reminder.

In step 608, process 600 polls for the event set in step 606. On occurrence of the event, step 610, the OLED display is switched to the second skin. If the event is not received ("No" branch) process 600 continues to step 612.

In the embodiment of process 600, a low battery state detection is also included. If the state of charge of the portable device's battery is low, and the device is not AC powered, in step 614 the skin is switched to a low battery alert display. This may be any predetermined skin set by the manufacturer, for example, which could be a textual display or a flashing color or similar display. If the state of charge of the battery is not low, or the device is being powered from an AC source, process 600 returns to the event polling loop, step 608.

Figure 7:
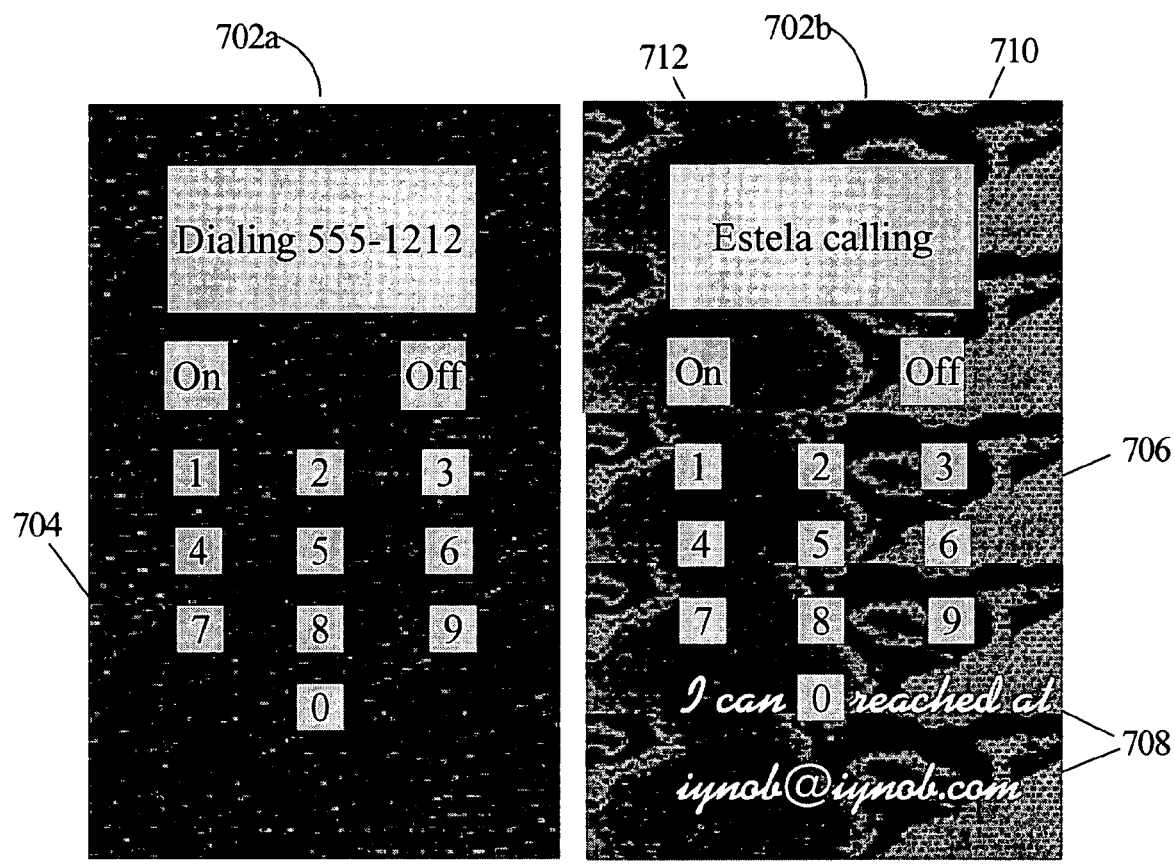
FIG. 7 illustrates exemplary cell phones with display skin patterns associated with events in accordance with the methodology of FIG. 6.

This may be illustrated by the four examples of a cell phone with OLED skin in FIG. 7, cell phones 702*a,b*. Cell phone 702*a* displays the "lizard skin" pattern 704, which may, in an embodiment of the present invention in accordance with methodology 600, FIG. 6, been selected by the user as the display during normal operation.

On receipt of an incoming call from a specified originator, the display skin may change to reflect a skin associated therewith, as previously discussed. Cell phone 702*b* displays skin 706 including a digital message 708 in response to an incoming message from the user's spouse, say, as indicated by the sender's name 710 on conventional LCD display 712.

Although the present invention and its advantages have been described in detail, it should be understood that various changes, substitutions and alterations can be made herein without departing from the spirit and scope of the invention as defined by the appended claims.

What is claimed is:

1. A portable data processing device comprising:
   a first display device for receiving signals for displaying first information;
   a second display device for receiving signals for displaying second information, said second display forming a skin of said data processing device;
   a graphics engine for receiving data for generating display signals for said first information and said second information said data for generating display signals received from a central processing unit (CPU) in response to a data processing application; and
   driver circuits coupled to said first and second display devices, wherein corresponding ones of said driver circuits are coupled to said first and second displays, said driver circuits coupled to an output of said graphics engine, and wherein said first and second display devices having disjoint display areas.

2. The portable data processing device of claim 1 further comprising switching circuitry for selectably switching an output signal from said graphics engine to the corresponding ones of said driver circuits.

3. The portable data processing device of claim 2 wherein said switching circuitry switches said signals for displaying first information to a driver circuit coupled to said first display device and switches signals for displaying second information to a driver circuit coupled to said second display device.

4. The portable data processing system of claim 1 wherein said second display device comprises a flexible organic light emitting device (OLED) display.

5. The portable data processing system of claim 4 wherein said portable data processing system comprises a cell phone.

6. The portable data processing system of claim 4 wherein said portable data processing system comprises a notebook computer.

7. The portable data processing system of claim 4 wherein said portable data processing system comprises a personal digital assistant.

8. The portable data processing system of claim 1 wherein said first information is generated by a first, user-selected source, and said second information is selected by a second, user-selected source.

9. A portable data processing system comprising:
   a first display device for receiving signals for displaying first information;
   a second display device for receiving signals for displaying second information, said second display forming a skin of said data processing device;
   a first graphics engine for receiving data for generating display signals for said first information from a first frame buffer in a graphics memory;
   a second graphics engine for receiving data for generating display signals for said second information from a second frame buffer in said graphics memory; and
   driver circuits coupled to said first and second display devices, wherein corresponding ones of said driver circuits are coupled to said first and second displays, a first one of said driver circuits coupled to an output of said first graphics engine and a second one of said driver circuits coupled to an output of said second graphics engine, wherein said first and second display devices having disjoint display areas, and said data for generating display signals received from a central processing unit (CPU) in response to a data processing application.

10. The portable data processing system of claim 9 wherein said second display device comprises a flexible organic light emitting device (OLED) display.

11. The portable data processing system of claim 10 wherein said portable data processing system comprises a cell phone.

12. The portable data processing system of claim 10 wherein said portable data processing system comprises a notebook computer.

13. The portable data processing system of claim 10 wherein said portable data processing system comprises a personal digital assistant.

14. The portable data processing system of claim 9 wherein said first information is generated by a first, user-selected, source and said second information is generated by a second, user-selected source.

15. A method for displaying alternate data on a portable device skin comprising:
    receiving a first user selection identifying a first display data source;
    receiving a second user selection identifying a second display data source, said second user selection associated with a user-specified event; and
    switching a display skin from said first display source to said second display source in response to an occurrence of the user-specified event.

16. The method of claim 15 further comprising:
    detecting a low-battery condition in the portable device; and
    switching the display skin from to a third, predetermined display data source in response to the low-battery condition.

* * * * *